(12) United States Patent
Lehtinen et al.

(10) Patent No.: US 6,711,515 B1
(45) Date of Patent: Mar. 23, 2004

(54) ROBUST AND EFFICIENT METHOD FOR SMOOTHING MEASUREMENT RESULTS

(75) Inventors: Joni Lehtinen, Kangasala (FI); Tomi Vaara, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/009,934

(22) PCT Filed: May 17, 2000

(86) PCT No.: PCT/FI00/00443

§ 371 (c)(1),
(2), (4) Date: Feb. 15, 2002

(87) PCT Pub. No.: WO00/72616

PCT Pub. Date: Nov. 30, 2000

(30) Foreign Application Priority Data

May 18, 1999 (FI) .................................................. 991127

(51) Int. Cl.[7] .................................................. H04B 1/10
(52) U.S. Cl. .......................................... 702/85; 341/144
(58) Field of Search ........................... 702/85; 341/144, 341/143; 375/140, 347

(56) References Cited

U.S. PATENT DOCUMENTS 5,398,303 A 3/1995 Tanaka .......................... 395/51
5,587,711 A 12/1996 Williams ..................... 341/144

FOREIGN PATENT DOCUMENTS

JP 62274224 A 11/1987 .......... G01G/23/37

OTHER PUBLICATIONS

Song, "Timing Synchronization Using the Reliability Check and Smoothing Algorithm in the Fading Channels", IEICE Trans. Commun., vol. E82 B. No. 4 Apr. 1999, pp. 664–668.

Wu et al., "Weighted D–Filtering", IEEE Transaction on Circuits and Systems, vol. 38, No. 4, Apr. 1991, pp. 446–449.

Van Dijk et al., "Testing for Smooth Transition Nonlinearity in the Presence of Outliers", 1996, Tinbergen Institute, Erasmus University, Rotterdam, NL, pp. 1–36.

Primary Examiner—Kamini Shah
(74) Attorney, Agent, or Firm—Cohen, Pontani, Lieberman & Pavane

(57) ABSTRACT

A method for smoothing measurement results is presented, in which a parameter is calculated, using weight factors, from a number of measurement results in a sample. The parameter is a measure of the center of the sample and has a breaking point different from zero. Using this method, neither an increased number of measurements nor the removal of outliers are required when the reliability of individual measurement results is questionable due to interference, such as momentary burst noise.

15 Claims, 9 Drawing Sheets

ROBUST AND EFFICIENT METHOD FOR SMOOTHING MEASUREMENT RESULTS

FIELD OF THE INVENTION

The invention relates generally to the smoothing of results measured as a function of time. Particularly the invention relates to the smoothing of measurement results with the aid of such a measure of the center of a sample which is not sensitive to individual deviating measurement results.

BACKGROUND OF THE INVENTION

The network elements of wireless mobile networks measure at regular intervals for instance the strength, quality and interference level of the radio signal. Changes in the state of the network are then made on the basis of the measurement results, if required. For instance, a decision to shift a wireless terminal's connection from one base station to another (a handover), or a decision to control the signal's transmission power is made on the basis of such measurement results. Thus measurements made at regular intervals are an essential and necessary part in the operation of the radio access network.

The measurement results generally follow a certain, often unknown probability distribution. Thus the individual measurement results vary slightly, also in a situation where the quantity to be measured remains constant and when there are no extra interfering factors. The aim is to estimate the real value of the measured quantity on the basis of the measurement results. Thus the situation is similar as that in estimation, where one on the basis of a sample having a certain size tries to define parameters which describe the probability distribution behind a phenomenon. For instance, the sample mean is an estimate for the average of the distribution behind the measurement results.

There may also occur large variations in the individual measurement results also as a result of for instance occasional disturbances. Thus individual results measured as a function of time are generally smoothed by averaging. The averaging is made so that small successive sliding samples are taken from the measurement results, and the average is calculated from these samples. Thus the individual measurement results are replaced by the average calculated with the aid of a few successive results, and so the effect of at least a part of the individual deviating values (outliers) can be eliminated. If the measurement results are not smoothed, unnecessary changes may be made in the network status on the basis of these individual deviating measurement results.

The prior art network elements of the radio access network use the average to smooth the measurement results: a certain amount of successive measurement results form a sample from which the arithmetic average is calculated. The measurement results are not processed before the calculation of the average. Deviating values can in principle be omitted from the measurement results, but this requires extra logic, in order to decide which measurement result values deviate sufficiently and can therefore be omitted, and extra calculation in the processing of the measurement results. Different measurements and smoothing of the measurement results are made so much in the network elements that the processing of the measurement results must be as straightforward as possible.

FIG. 1 shows a prior art smoothing of measurement results using a moving average. The horizontal axis in the figure represents the sequence number of an individual measurement and the vertical axis represents the measurement result. The individual measurement results shown by dark circles are generated by simulation. In radio access networks the measurement results are often presented as integers between 0 and 63, i.e. as binary numbers with a length of six bits. The individual measurements shown in FIG. 1 are generated as follows: first there is generated raw data with the aid of a normal distribution having the average 30.5 and a standard deviation of 7, and then the raw data is averaged with an arithmetic average using a sample size of 4. This provides as a result a measurement point set which has a normal distribution with the average 30.5 and the standard deviation 3.5. For instance in a network element of the radio access network the radio signal strength measurement could produce a measurement result corresponding to the measurement point set shown in FIG. 1.

The measurement results shown by dark circles in FIG. 1 are smoothed using a moving arithmetic average. As an example the sample size used in the smoothing is 4. In FIG. 1 the moving average is marked by a uniform line, and it follows the trends of the measurement results with a short delay. This delay is caused by the fact that the four previous measurement points, or more generally the number of measurement points determined by the sample size used in the smoothing, always have an effect on the smoothing result at a certain moment.

A problem in the use of the prior art moving average is that if a sample contains even one value which deviates considerably from the other values, then the sample average will change considerably. The size of the change is further proportional the fact how much the said single measurement result deviates from the other measurement results in the sample. An individual measurement result, which is measured for instance in a disturbance situation, may have a so strong effect on the moving average that for instance the transmission power is interpreted to require a large change. The next moving average which falls within the approved limits will then again cause the transmission power to return to the original value. High requirements are put on the power control algorithm and other control algorithms so that they behave well in such situations.

Prior art problems relating to the use of a moving average are illustrated in FIG. 2. In the same way as in FIG. 1 the horizontal axis in FIG. 2 shows the sequence number of an individual measurement, and the vertical axis shows the measurement result. Interference peaks are added to the simulated measurement results shown in FIG. 1, so that the peaks cause a change of either 25 or −25 units to an individual measurement result. This simulated time series of measurement results corresponds to a situation where an interference factor affects the measurement results. FIG. 2 shows with a uniform line the moving average, which again as an example is calculated using samples of four measurement points, and which is sensitively following the interference peaks. Its value increases clearly when a positive interference peak is included in the sample used for calculating the moving average, and correspondingly the value decreases when the sample includes a negative interference peak. If the horizontal lines at the values 25 and 40 on the vertical axis shown for illustrative purposes would represent for instance limits, which if exceeded would cause the radio signal power control algorithm to start to change the transmission power, then in the situation shown in FIG. 2 the transmission power control would be unnecessarily started several times.

FIG. 3 shows simulated measurement data having more interference peaks than the situation shown in FIG. 2. To the measurement point set shown in FIG. 2 there are added interference peaks which cause a change of either 25 or −25 units to the individual measurement results. Even if we from the measurement results shown in FIG. 3 still can approximately distinguish a clear trend staying between the values 25 and 40, the moving arithmetic average does not follow this trend at almost any measurement point of the set. For the smoothing of the measurement points we have also in this example used a sample size of four.

If the sample contains outliers the size of the window used for the calculation of the moving average has an effect on the size of the change of the sample average: the larger the sample the smaller effect do the individual outliers have. However, the use of a large sample in the calculation of the moving average can result in that the measurement results are smoothed too much, i.e. that essential changes in the measurement results are detected after a too long delay. Certain control algorithms require for their correct function that the response of the control actions is immediately visible. These control algorithms place their own limits on the sample size used for smoothing the measurement results. Further, the use of a large sample requires more calculation and m y capacity in the processing of the measurement results.

SUMMARY OF THE INVENTION

An object of the invention is to present a method for smoothing measurement results, which method is not sensitive to individual deviating measurement results. An advantage is that the method can be applied in a straight-forward way and that it does not require a large sample in order not to react to individual deviating measurement results. It is also advantageous that in favourable conditions the smoothed measurement series generated by the method does not differ from the measurement series smoothed with the aid of an arithmetic average. Further it is advantageous that the importance of individual measurement results can vary, and that in order to function properly the method does not require the measurement results to be normally distributed.

The object of the invention is attained with a method which for smoothing the measurement results uses such a measure of the center which has a high breaking point and which for the calculation takes into account the reliability or importance of the measurement points with the aid of weight factors.

A method according to the invention for soothing measurement results, the method comprising steps of
measuring values for a quantity relating to a radio link of a radio access network, resulting in a plurality of Excrement results,
selecting the measurement results used in the smoothing,
giving a finite weight factor for each of said measurement results,
selecting the sample size used in the smoothing,
taking samples of which each sample contains a number of measurement results, the number being determined by said sample size,
selecting a parameter representing a sample for smoothing samples, and
on the basis of said sample, calculating a value for the parameter representing the sample, is characterised in that
said weight factors are used in the calculation of said parameter, and
said parameter representing a sample is selected to be a measure of the center of a sample, the value of the breaking point of said measure of the center being substantially different from zero.

A radio access network's network element according to the invention comprising
means for measuring values for a quatity relating to a radio link of the readio access network, and
means for smoothing measurement results, is characterised in that said means comprise means for attaching a weight factor to each measurement result used in the smoothing, and means for calculating a measure of the center for a sample formed of measurement results using such a measure of the center, whose breaking point is substantially different from zero.

A mobile station according to the invention comprising
means for measuring values for a quantity relating to a radio link of a radio access network, and
means for smoothing measurement results, is characterised in tat said means for smoothing measurement results comprise means for attaching a weight factor to each measurement result used in the smoothing, and means for calculating a measure of the center for a sample formed of measurement results using such a measure of the center, the value of whose breaking point is substantially different from zero.

The invention relates also to a system for transmitting information by radio in a radio access network, the system comprises
means for measuring values for a certain first quantity relating to a first radio link and
means for controlling a certain second quantity related to a radio link on the basis of said measurement results, and it is characterised in that the system further comprises
means for attaching a weight factor to each measurement result used in the smoothing, and
means for calculating a measure of the center of a sample formed of measurement results using such a measure of the center, the value of whose breaking point is substantially different from zero.

The invention also relates to a base station controller of a radio access network, comprising
means for receiving measurement results of a quantity relating to a radio link, and
means for smoothing measurement results, and being characterised in that said means for smoothing measurement results comprise means for attaching a weight factor to each measurement result used in the smoothing, and means for calculating a measure of the center of a sample formed of measurement results using such a measure of the center, the value of whose breaking point is substantially different from zero.

In the method according to the invention the parameter used for the smoothing is the measure of the center of the sample. The measure of the center represents the value of that measurement point, around which the measurement results of the sample are centred. If the measurement results have a symmetric probability distribution and the values close to the centre of the distribution have the highest probability, then the different measures of the center calculated on the basis of the measurement results generally produce a parameter which does not substantially differ from the sample mean. For instance different measures of the center representing a measurement result sample having no deviating measurement results caused by interference will generally obtain a value which is almost the same as the sample mean.

In the method according to the invention Me parameter representing the measurement result sample is selected so that the individual deviating measurement results contained in the sample will not easily change its value. Thus the parameter gives a reliable idea of the actual phenomenon being measured, and it will not react on single interference situations and erroneous measurements, The sensitivity of the measure of the center to deviating measurement results is represented by the breaking point.

The breaking point is defined as follows [1]. An estimate $\mu_n = \mu_n(\chi_1, \ldots, \chi_n)$ of the measure of the center is calculated with the aid of the original observations $\chi_1, \ldots, \chi_n$. If we with the aid of a m suitably selected poor (i.e. a very strongly deviating) additional observations $\chi_{n-1}, \ldots, \chi_{n+m}$ can get the difference $|\mu_{n+m}(\chi_1, \ldots, \chi_n, \chi_{n-1}, \ldots \chi_{n+m}) - \mu_n(\chi_1, \ldots, \chi_n)|$ to be arbitrarily large, then it is said that $\mu_n$ breaks at the mixing ratio m/(n+m). The lowest possible such ratio is called the breaking point. The breaking point tells directly the number of those samples which substantially deviate from the correct, but unknown, average, and which number of samples is sufficient to distort the measure of the center estimated on the basis of the sample. For instance, the breaking point for the average is 1/(n+1), i.e. already one deviating value can have a considerable effect on the sample average. For the median, which also is a measure of the center, the breaking point is ½. Thus the median can considerably better tolerate deviating values in the sample. The values of the breaking points of the measures of the center which are used in practice are in the interval 0 . . . ½.

The above presented mathematical definition of the breaking point requires that the deviating values added to the sample can be arbitrarily high. In real measurements the measurement results have some limits, between which the measurement results will occur: for instance the results of measurements made in radio access networks are often presented by the values 0 . . . 63. The sufficient number of deviating values indicated by the breaking point can not thus be directly applied to real measurement result samples. On the other hand, if the addition of a certain number of deviating values to the sample, these values being for instance in the interval 0 . . . 63, substantially changes the value of the parameter calculated on the basis of the sample, then in practice the parameter can be said to break, even if the arbitrarily large difference mentioned in the mathematical definition was not created. In this description the breaking point means a breaking point obtained from the mathematical definition, but the breaking of the parameter means a substantial change of the parameter value when deviating values are added to the sample.

For smoothing the measurement results the method according to the invention uses the measure of the center having a value substantially deviating from zero. For instance, when samples of four measurement points are used, the measure of the center having a breaking point greater than 0.25 tolerates one deviating value in the sample without changing the center of the sample. It is also advantageous to use in the method according to the invention such a measure of the sample's center having a tolerance for deviating values bound only to the number of the deviating values contained in the sample and not to the magnitude of the deviation of these deviating values.

When the breaking point of the measure of the center used for the smoothing in the method according to the invention is known, it is possible to estimate the minimum sample size on the basis of the breaking point. The estimation utilises also the knowledge of how probable the deviating values are in the measurement results. If there is a certain probability of the deviation, then the higher the breaking point of center the smaller is the sample size which can be used, without the smoothing method reacting to single deviating values in the sample. A small sample size means an efficient method regarding the calculation and a minimal delay regarding how fast the smoothing reacts to real changes in the measurement results.

In the method according to the invention weight factors are attached to the individual measurement results. These weight factors represent the importance of the measurement results. In radio access networks many quantities are measured both by single measurements and by measuring a certain number of times, and by representing this sample with one parameter. In a situation of this kind the measurement results can be given weight factors which indicate how many individual measurements have been made in order to obtain the respective result. If the results and the weight factors are transmitted to another network element of the radio access network, then this element can with the weight factors take into account that a part of the measurements was already a result of a number of individual measurements. The weight factors can also be inverse numbers of the error estimates of individual measurements, if such estimates are known. Then the most accurate measurement results have the greatest effect when the final result is calculated.

The use of finite weight factors in the calculation of the measure of the sample's center will not help in a situation where the measurement results can deviate arbitrarily much from the sample's average. The measure of the center will break in a situation where the sample contains more deviating values than the measure of the center used for smoothing can cope with, and where these values can have an arbitrary size. Thus the breaking point of the measure of the center, where finite weight factors are used in the calculation of the measure, is the same as the measure of the center which is calculated without weight factors.

However, the measurement results lie generally within certain limits, and then the finite weight factors can be used to reduce for instance the relative weight of the measurement results which are known to be inaccurate, when the measure of the center is calculated. Thus the measure of the center used for the smoothing may remain unbroken also in a situation where the sample used for smoothing contains a higher number of deviating values than the measure of the center in theory could tolerate (i.e. the number is higher than the share of them in the sample indicated by the breaking point).

In the method according to the invention for smoothing the measurement results the samples can be chosen for instance in a sliding manner so that the largest part of the measurement points in consecutive samples are the same. Another way to choose the samples is for instance such that consecutive samples do not contain common measurement points, and that measurement points belonging to neither sample are left between consecutive samples. The invention does not take into account in more detail how the samples are chosen. Neither does the invention take into account how the measurement results used in the smoothing are chosen from a larger set of measurement results, if all available measurement results are not used.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

The invention is described in more detail below with reference to preferred embodiments of the invention and to the enclosed figures, in which.

DETAILED DESCRIPTION OF THE PRESENTLY PREFERRED EMBODIMENTS

Figure 1:
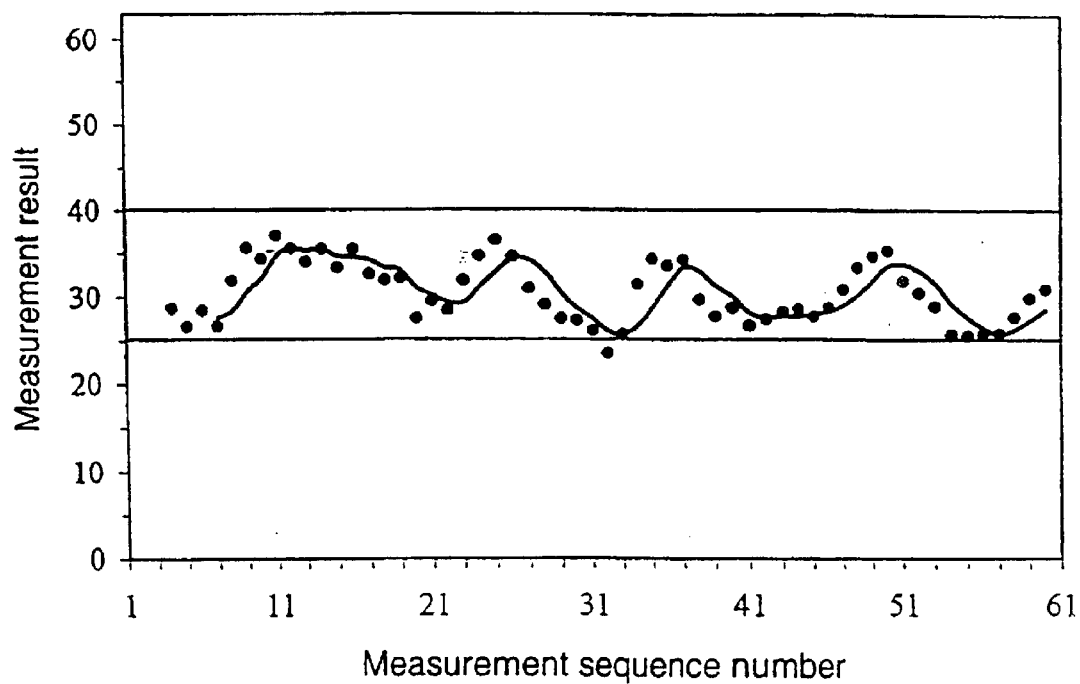
FIG. 1 shows measurement results which do not contain interference and which are smoothed with a prior art method.
Figure 2:
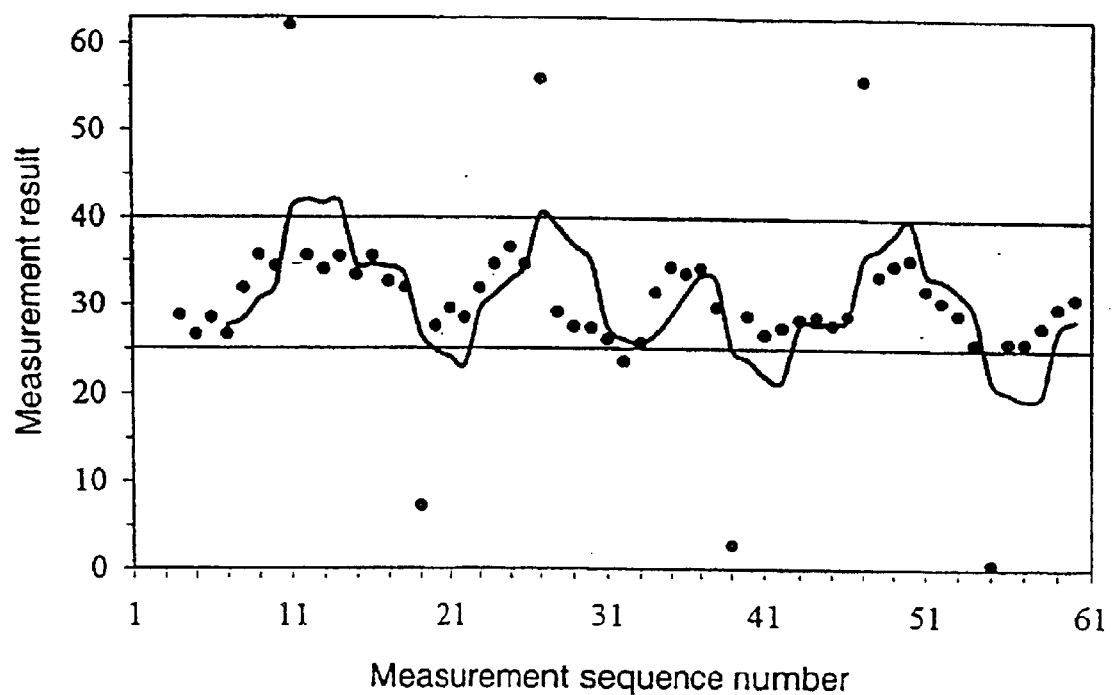
FIG. 2 shows second measurement results which are smoothed with a prior art method but which contain interference peaks.
Figure 3:
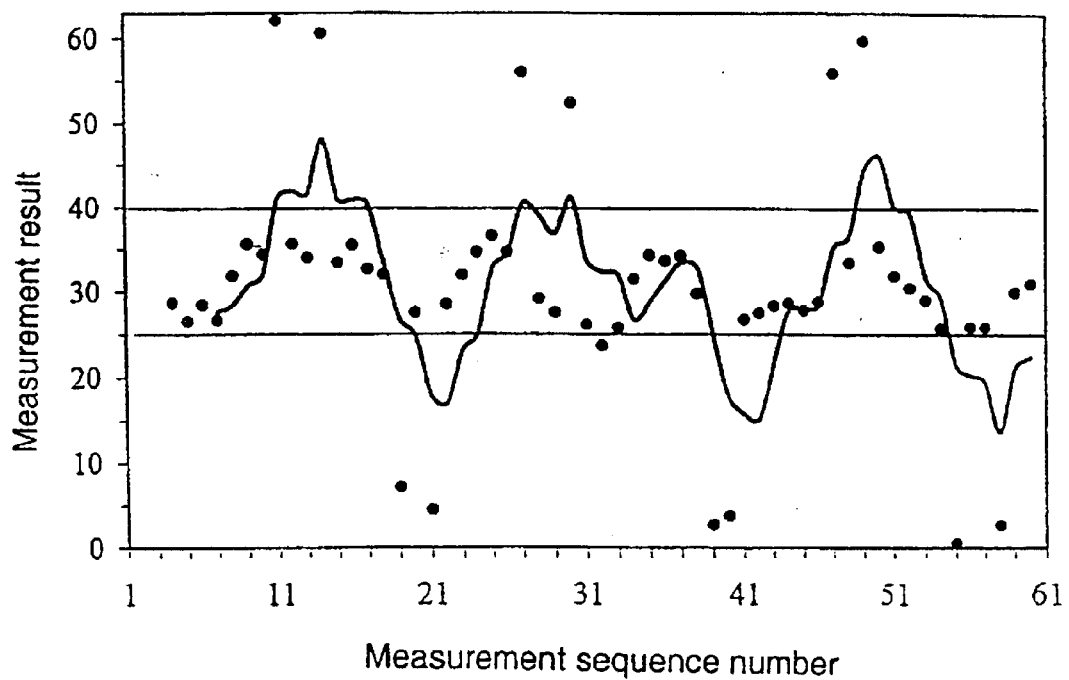
FIG. 3 shows third measurement results which are smoothed with a prior art method but which contain more interference peaks.

Reference to the FIGS. 1 to 3 was made already above in the description of prior art.

Figure 4:
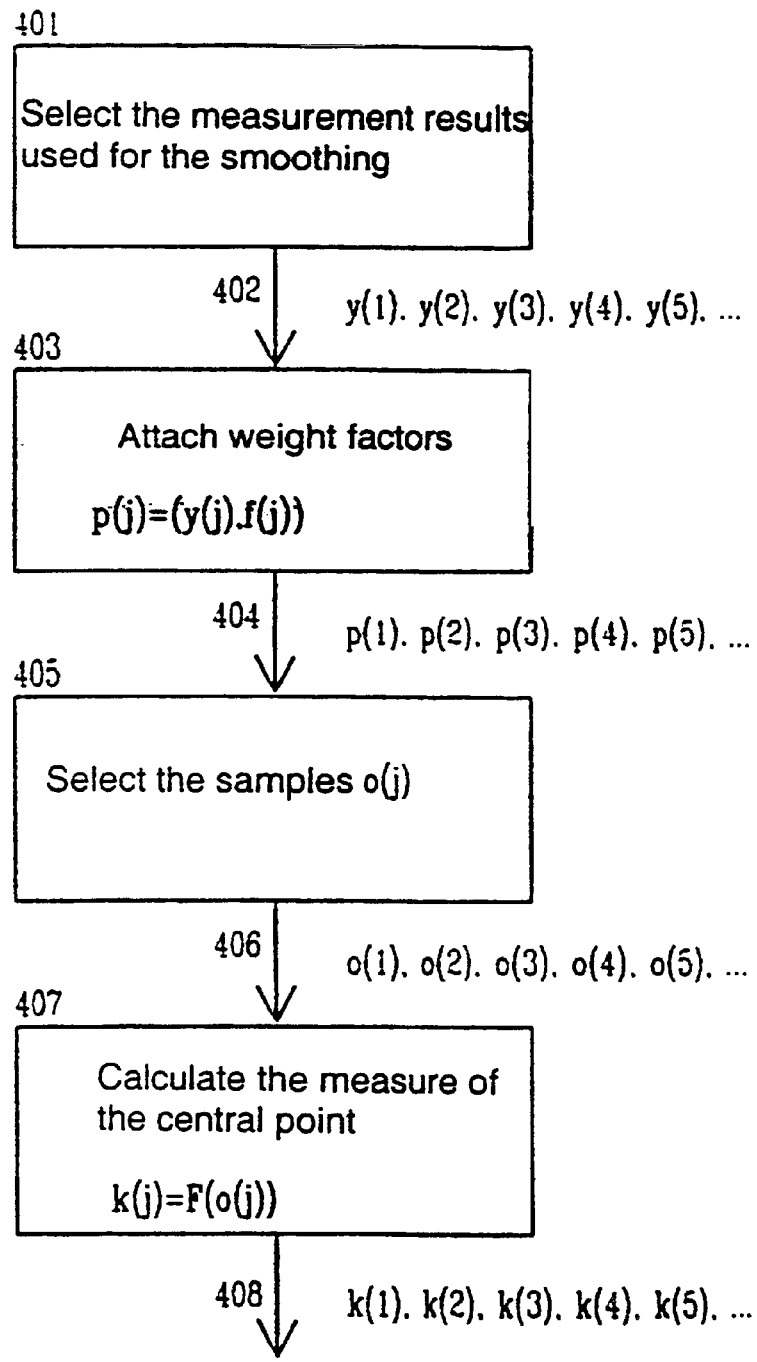
FIG. 4 shows a schematic drawing of a method according to a first embodiment of the invention.

FIG. 4 shows in a schematic drawing a method according to a first preferred embodiment of the invention for smoothing measurement results. In step 401 we select from the measurement results those which are used in the smoothing. If there is a large number of measurement results, then we can include in the smoothing for instance only every second result. The result is a sequence of measurement results y(j) shown by the arrow 402, where j represents the index of the measurement result. In the next step 403 weight factors f(j) are attached to each measurement result y(j), and this results in a sequence of arranged pairs p(j)=(y(j), f(j)) (arrow 404).

In step 405 we select from this sequence of arranged pairs samples o(j) having a size n. The samples can be selected so that they are interleaved, for instance so that the lowest index of the pairs in each sample is one greater than the lowest index in the previous sample:

$o(j)=\{p(j), p(j+1), \ldots, p(j+n-1)\}$, $o(j+1)=\{p(j+1), p(j+2), \ldots, p(j+n)\}$.

If there is a large number of measurement results it is possible to select the samples for instance so that the lowest index of the pairs in each sample is one higher than the highest index of the pairs in the previous sample:

$o(j)=\{p(j), p(j+1), \ldots, p(j+n-1)\}$, $o(j+1)=\{p(j+n), p(j+n+1), \ldots, p(j+2n-1)\}$.

Then each measurement result belongs only to one sample, and the number of original measurement results is about n times the number of measurement result samples.

In step 407 we calculate the sample's measure of the center k(j) on the basis of each sample j. This measure of the center of the sample is calculated in FIG. 4 with the aid of the function F. The function F takes as its arguments all measurement result/weight factor pairs p(j) belonging to the sample. In the method according to the first preferred embodiment of the invention we use such a measure of the center in which the value of the breaking point substantially deviates from zero.

Figure 5:
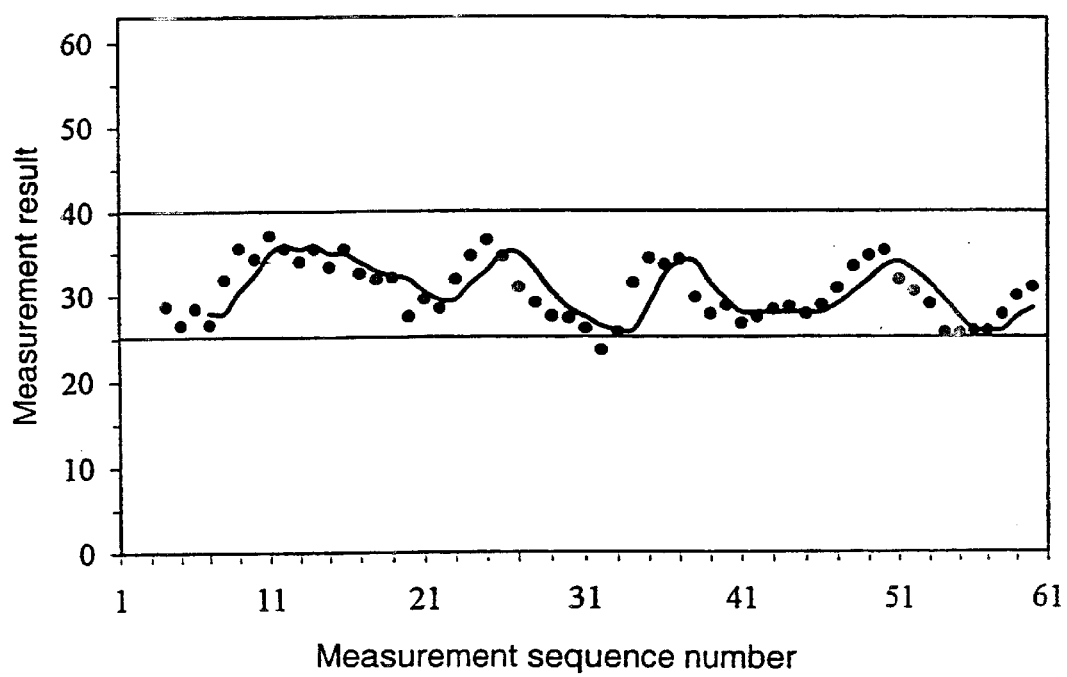
FIG. 5 shows measurement results without interference which are smoothed with a method according to another preferred embodiment of the invention.

FIG. 5 shows the same measurement results as in FIG. 1. In the method according to the second preferred embodiment of the invention we use the Hodges-Lehmann estimate provided with weight factors, and all measurement results are used in the smoothing. If the sample to be smoothed contains the observations $\chi_1, \ldots, \chi_n$ and the finite weight factors $f_1, \ldots, f_n$ attached to them, then the weighted Hodges-Lehmann estimate is calculated as follows. First we calculate from the observations $\chi_1, \ldots, \chi_n$ pairwise the weighted averages $w_k$ with the formula:

$$w_k = \frac{f_i \chi_i + f_j \chi_j}{f_i + f_j}, k = 1, \ldots, m, i, j = 1, \ldots n; i \leq j.$$

The number of pairwise averages is m=n(n+1)/2. These pairwise averages are arranged in the order of magnitude $w_1 \leq \ldots \leq w_m$. The Hodges-Lehmann estimate is the median of these weighted pairwise averages, i.e.:

m is odd: $HL=w_k$, when $$k = \frac{m-1}{2}$$

m is even:

$$HL = \frac{w_{m/2} + w_{(m/2)+1}}{2}$$

In FIG. 5 we use for the smoothing of the measurement results a weighted Hodges-Lehmann estimate according to the second preferred embodiment of the invention where all weight factors are as an example chosen to be equal and the sample size to be four. The sample size is thus the same as the sample size used for the calculation of a moving average shown in FIG. 1. As we can observe in FIG. 5, the smoothing made with the aid of the weighted Hodges-Lehmann estimate produces in practice the same result as the moving average, when the individual measurement results do not contain values which deviate considerably from the others.

It can be shown that the value of the breaking point of the Hodges-Lehmann estimate is about $1-1/\sqrt{} \approx 0.29$ [2]. This means that when we use a sample size of for instance four measurement points, then one of these measurement points can deviate considerably from the others without changing the result produced by the Hodges-Lehmann estimate. This is seen clearly also in FIG. 6, which shows measurement results smoothed with the aid of the weighted Hodges-Lehmann estimate. The simulated measurement results are the same as those shown in FIG. 2. As an example all weight factors are chosen to be equal, and the sample size to be four.

Unlike the smoothing based on a moving average shown in FIG. 2 the smoothing made with the aid of the Hodges-Lehmann estimate according to the second preferred embodiment of the invention does not react on individual deviating measurement results. The result of the smoothing in FIG. 6 follows the more long-term trends of the measurement result sequence, but its value does not change abruptly when individual deviating values are contained in the smoothing sample. Generally the individual deviating values have been measured erroneously, or they are caused by some interference, so that the long-term trends are often more essential, for instance regarding the power control algorithms. Thus the smoothing made with the aid of the Hodges-Lehmann estimate according to the second preferred embodiment of the invention behaves well in this sense.

Figure 6:
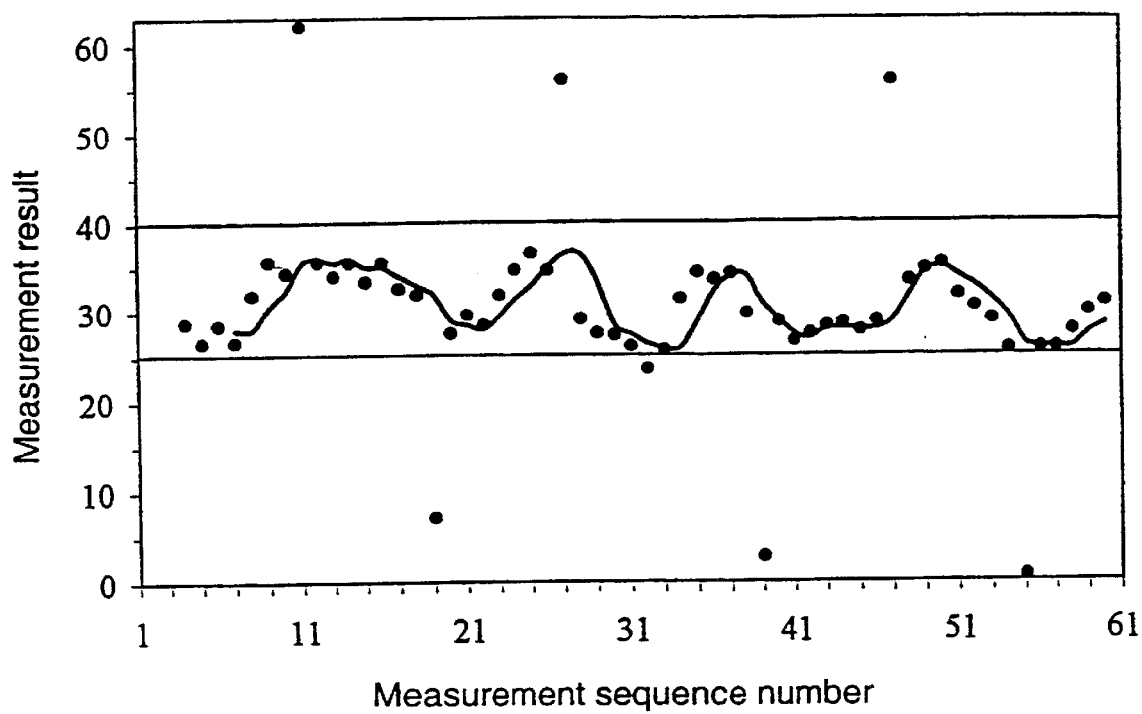
FIG. 6 shows second measurement results containing interference peaks which are smoothed with a method according to another preferred embodiment of the invention.
Figure 7:
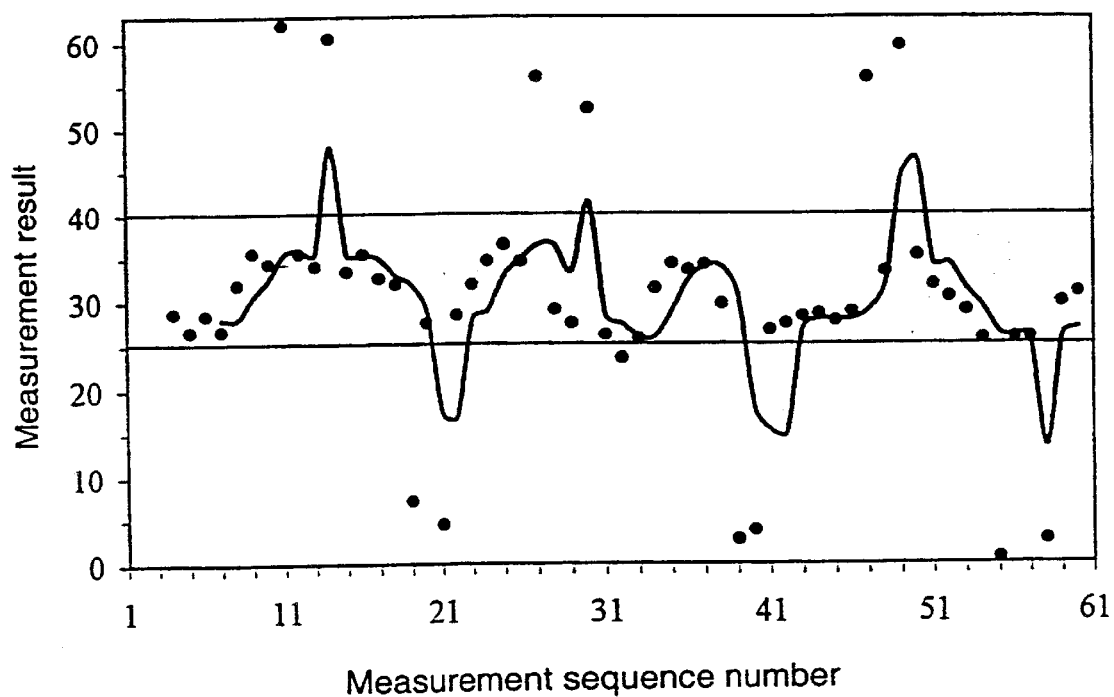
FIG. 7 shows third measurement results containing more interference peaks which are smoothed with a method according to another preferred embodiment of the invention.

FIG. 7 shows simulated measurement data which comprises the measurement results shown in FIG. 6, and in addition interference peaks. The set of measurement points is the same as the set of measurement points shown in FIG. 3. The Hodges-Lehmann estimate according to the second preferred embodiment of the invention is used to smooth the set of measurement points, so that the all values of the weight factors are equal, and that the sample size is 4.

FIG. 7 shows clearly how the smoothing reacts on measurement results deviating strongly at certain measurement points. At these measurement points (at the horizontal axis values 15, 21, 22, 30, 40–42, 49, 50 and 58) the sample used for the calculation of the smoothing contained two interference peaks, and when the Hodges-Lehmann estimate is used this is sufficient for breaking the measure of the center (the Hodges-Lehmann breaking point 0.29 is lower than ½). At the measurement points 39 and 40 the consecutive measurement points have disturbances, and this causes the smoothing to break in three consecutive smoothing points. However, in situations where there are at least two measurement results without interference between the interference peaks, the smoothing follows the trend of the measurement points which do not contain interference.

Figure 8:
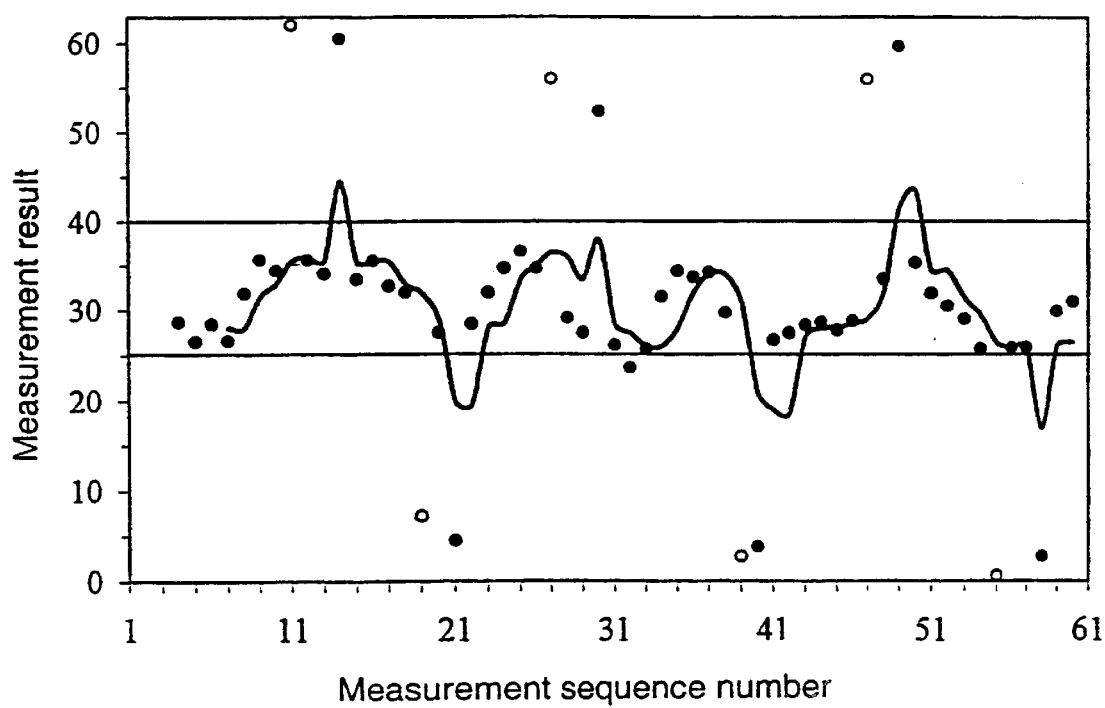
FIG. 8 shows fourth measurement results smoothed with a method according to another preferred embodiment of the invention.

FIG. 8 shows the same simulated measurement results as in FIG. 7. The difference compared to FIG. 7 is that in the situation shown by FIG. 8 a part of the interference peaks are assumed to come from measurements which are different from the other measurement points. These interference peaks are marked in FIG. 8 with light circles. For instance in the radio access network the measurement results are often generated by measurements made at certain intervals, to which measurements there are added instant measurements made at longer intervals. These instant measurements can be for instance results from individual measurements, and the actual measurement points can be for instance results of certain other individual measurements made at shorter intervals and smoothed with a sample of a certain size. For instance in a radio access network the measurements are reported to the base station controller about two times per second, and the dark circles in FIG. 8 could represent such measurements smoothed with a certain sample size.

The measurement results measured at different intervals and in different ways shown in FIG. 8 can come e.g. from different network elements. They are sent to e.g. a certain network element, in which they are to be processed in one run. The method according to a preferred embodiment of the invention can in this situation be used so that the pre-processed measurement results are given a weight factor of for instance 3, if originally three individual raw measurements are measured for each measurement point marked by a dark circle. The individual measurement results marked by light circles are given a weight factor of 1. When all measurement results are smoothed, it is thus also possible to take into account that a part of the results come from a number of individual measurements.

In FIG. 8 the sample size used in the smoothing is four, as an example. Then two interference peaks in the sample are sufficient to break the Hodges-Lehmann estimate used in the smoothing. By comparing the FIGS. 7 and 8 we notice that the smoothing breaks at the same measurement points. However, also in the situation shown in FIG. 8 the broken smoothed values remain closer to the average of the set of the measurement points. For instance at the measurement point 30 on the horizontal axis we notice that the smoothing in FIG. 7 exceeded the value 40 units, while in FIG. 8 it remains below this value. In the situation shown in FIG. 8 it is thus possible with the aid of the weight factors to take into account that the measurement results come from two measurement series with different reliabilities. If the measurement point coming from the measurement series with the lower reliability deviates from the others, then it has a lower effect on the value of the smoothing than a measurement point with the same value but coming from a measurement series with a higher reliability.

Figure 9:
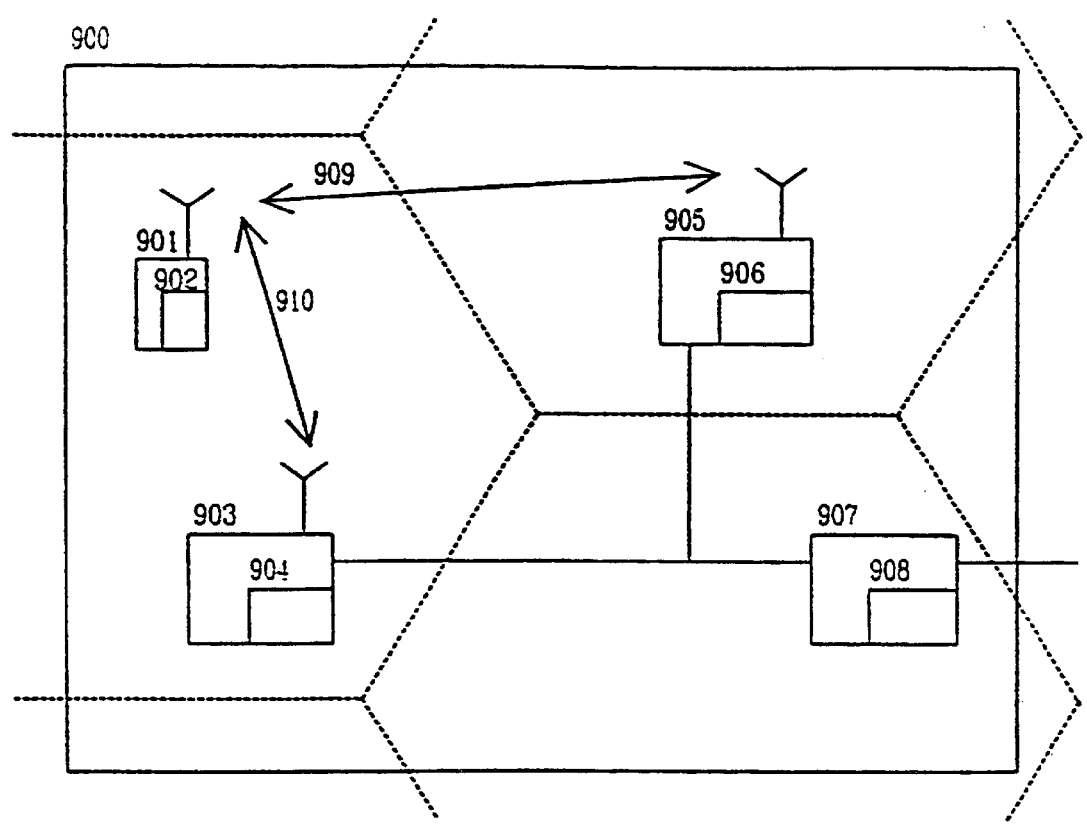
FIG. 9 shows a device which utilises a method according to a preferred embodiment of the invention.

FIG. 9 shows how the method for smoothing the measurement results according to the invention can be utilised for instance in a GSM network (Global System for Mobile Communications). In FIG. 9 the cells of the GSM network are marked with broken lines, and the transmission system 900 shown in FIG. 9 comprises base stations and a base station controller of the radio access network. The mobile station 901 shown in FIG. 9 contains a block 902 which is responsible e.g. for the measurement of the received radio signal strength. In the block 902 the measurement results are smoothed by utilising a method according to a preferred embodiment of the invention. The mobile station can for instance measure the strength of the signal transmitted by the base station 903 (this is marked by the arrow 910 in FIG. 9), through which its communication links pass. It can further measure for instance the background effect caused by the surrounding network, which impairs the signal-to-noise ratio observed by the mobile station, or the interference effect of the surrounding network on the received signal. These measurements are shown by the arrow 909 in FIG. 9. This arrow points at the base station 905, which is in the cell adjacent to the mobile station's own cell.

In addition to the mobile station also the network elements of the radio access network can have blocks which apply the measurement result smoothing methods according to the invention. In FIG. 9 there is as an example shown that the base stations 903 and 905 contain measurement result processing blocks 904 and 906, which use the smoothing method according to the invention. The base stations can for instance measure the strength of the signal transmitted by the mobile station. It is also possible that the mobile station, the base stations or other network elements of the radio access network, transmit forward the results which they have measured so that they can be used by the other network elements. For instance, the base stations shown in FIG. 9 can transmit to the base station controller 907 such measurement data transmitted by a mobile station, and where the measurement result processing block 908 in the base station controller is responsible for processing the received results with the smoothing method according to the invention. On the basis of the smoothed measurement results the base station controller 907 can for instance make a decision concerning a handover or concerning the control of the transmission power used by the base stations.

Above we have used a GSM network and the network elements of the GSM network as examples of a system where a method according to the invention can be utilised. However, this does not limit the use of the methods according to the invention only to a GSM network, but the methods can be used in all radio access networks. The methods according to the invention can be used for instance in the GPRS system (General Packet Radio Service) and the UMTS system (Universal Mobile Telecommunication System) and in their network elements, and in terminals which are used in these networks.

Thus, while there have been shown and described and pointed out fundamental novel features of the present invention as applied to a preferred embodiment thereof, it will be understood that various omissions and substitutions and changes in the form and details of the devices described and illustrated, and in their operation, and of the methods described may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

References:
[1] F. R. Hampel et al., Robust statistics: The approach based on influence functions, New York, Wiley, 1986, p. 98.
[2] Ibid, p. 112.

What is claimed is:

1. A method for smoothing measurement results, the method comprising the steps of:
   measuring values for a quantity relating to a radio link of a radio access network, resulting in a plurality of measurement results;
   selecting the measurement results used in the smoothing;
   giving a finite weight factor for each of said measurement results;
   selecting the sample size used in the smoothing;
   taking samples of which each sample contains a plurality of measurement results, the number of ad plurality being determined by said sample size;
   selecting a parameter representing a sample for smoothing samples; and
   calculating a value for the parameter from the sample;
   wherein said weight factors are used in the calculation of said parameter, and
   wherein said parameter representing a sample is selected to be a measure of the center of the sample, the value of the breaking point of said measure of the center being different from zero.

2. The method according to claim 1, wherein the samples are taken so that each measurement result belongs only to one sample.

3. The method according to claim 1, wherein the samples are taken so that a part of the measurement results belong to at least two samples.

4. The method according to claim 1, wherein the measurement results used in the smoothing are obtained from more than one measurement arrangement, and wherein a certain same weight factor value is chosen for the results from a certain measurement arrangement.

5. The method according to claim 1, wherein a Hodges-Lehmann estimate provided with weight factors is used as the measure of the center.

6. The method according to claim 5, wherein the same value is chosen for all said weight factors.

7. The method according to claim 1, wherein said measure of the center is chosen from a number of alternatives on the basis of the highest breaking point to guarantee that the sensitivity of said measure to deviating values contained in a certain sample depends as little as possible on the difference between said deviating values and an arithmetic average calculated on the basis of a second sample, which contains the value of said certain sample, without said deviating values.

8. A network element of a radio access network, the network element comprising
   means for measuring values for a quantity relating to a radio link of the radio access network; and
   means for smoothing measurement results, said means for smooth measurement results comprising:
      means for attaching a weight factor to each measurement result used in the smoothing; and
      means for calculating a measure of the center of a sample formed of a plurality of measurement results using such a measure of the center, whose breaking point is different from zero.

9. The radio access network's network element according to claim 8, wherein said means for calculating a measure of the center of the sample comprise means for calculating the Hodges-Lehmann estimate provided with weight factors.

10. A mobile station comprising
    means for measuring values for a quantity relating to a radio link of a radio access network; and
    means for smoothing measurement results, said means for smoothing measurement results comprising:
       means for attaching a weight factor to each measurement result used in the smoothing; and
       means for calculating a measure of the center for a sample formed of a plurality of measurement results using such a measure of the center, the value of whose breaking point is different from zero.

11. The mobile station according to claim 10, wherein said means or calculating he measure of the center of the sample comprise means for calculating the Hodges-Lehmann estimate provided with weight factors.

12. A system for transmitting information over a radio interlace, said system comprising:
    means for measuring values for a fist quantity relating to a radio link;
    means for controlling a certain second quantity related to a radio link on the basis of said measurement results;
    means for attaching a weight factor to each measurement result used in the smoothing; and
    means for calculating a measure of the center of a sample formed of a plurality of measurement results using such a measure of the center, the value of whose breaking point is different from zero.

13. The system according to claim 12, wherein said means for calculating the measure of the center of the sample comprise means for calculating the Hodges-Lehmann estimate provided with weight factors.

14. A base station controller of a radio access network, comprising
    means for receiving measurement results of a quantity relating to a radio link; and
    means for smoothing measurement results, said means for smoothing measurement results comprising:

means for attaching a weight factor to each measurement result used in the smoothing; and means for calculating a measure of the center of a sample formed of a plurality of measurement results using such a measure of the center, the value of whose breaking point is different from zero.

15. The base station controller according to claim 14, wherein said means for calculating the measure of the center of the sample comprise means for calculating the Hodges-Lehmann estimate provided with weight factors.

* * * * *